Figure 1:
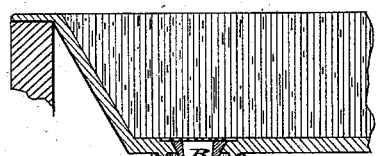

(No Model.)

J. W. ROGERS.
GAS TRAP.

No. 252,258. Patented Jan. 10, 1882.

Attest:
Geo. T. Smallwood Jr.
L. M. Hopkins

Inventor:
James Webb Rogers
By Knight Bros
Attys

UNITED STATES PATENT OFFICE.

JAMES W. ROGERS, OF WASHINGTON, DISTRICT OF COLUMBIA.

GAS-TRAP.

SPECIFICATION forming part of Letters Patent No. 252,258, dated January 10, 1882.

Application filed June 24, 1881. (No model.)

*To all whom it may concern:*

Be it known that I, JAMES WEBB ROGERS, a citizen of the United States, residing at Washington, in the District of Columbia, have invented Improvements in Gas-Traps, of which the following is a specification.

The subject of my invention is a device to prevent the escape of gas upward from a pipe or vessel while permitting the passage of liquids or air downward through or into said pipe or vessel.

It consists, essentially, of a flexible and compressible tube, forming a sack with an annular chamber fastened at top to or around the aperture, through which the upward escape of gas is to be prevented, said chamber containing a liquid acting by its gravity to close the tube in the absence of pressure within it, and the whole being so arranged that the pressure of gas within the pipe or vessel acting externally on all sides of the tube or annular chambered sack will combine with the weight of the contained liquid to effectually close the orifice against egress of the gas.

The invention is applicable to sewers and waste-water passages of various kinds where it may be desirable to permit the downward passage of water and any gross matter while preventing the escape of gas from said sewer or pipe, and it is also applicable to beer and wine casks for the purpose of a vent to admit air to the interior of the cask while preventing the escape of gas therefrom under internal pressure.

Without limiting myself to any particular material out of which the compressible tube may be made, or to any particular method of fastening its ends, I state that one way in which the objects aimed at have been attained is by turning a compressible tube, made of parchment, skin, animal-entrail, india-rubber, or other suitable thin and flexible material, partially inside out, and bringing the ends together one within the other, introducing a suitable quantity of glycerine or other liquid within the annular chamber thus formed, and securing the united ends around the orifice which is to be closed against the upward escape of gas while permitting the downward passage of fluids.

The invention further consists in placing the described flexible tube within a short pipe to limit its expansion as a further safeguard against the outward pressure of gas while adapting it to yield to a downward and internal pressure, as hereinafter described.

The invention further consists in combining with the aforesaid flexible annular tube elastic bands suitably arranged to aid in contracting it, as hereinafter described.

In order that my invention may be fully understood, I will proceed to describe the mode in which I have carried it into effect with reference to the accompanying drawings, in which—

Figure 2:
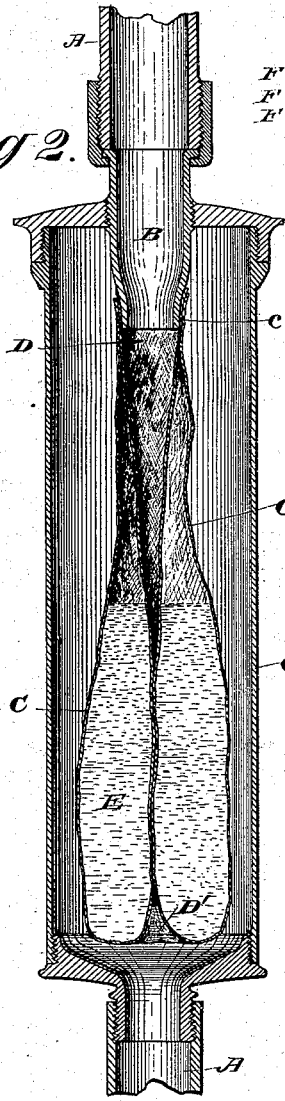
Figure 3:
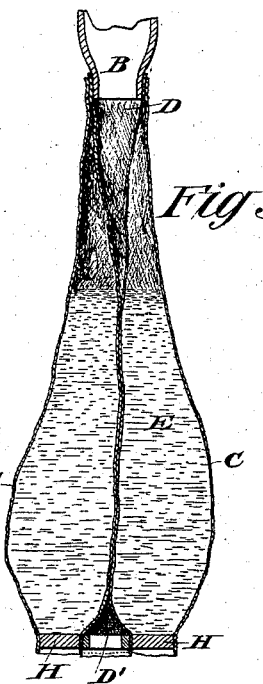
Figure 5:
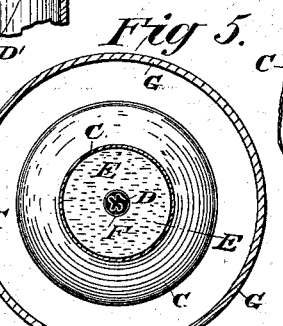
Figure 4:
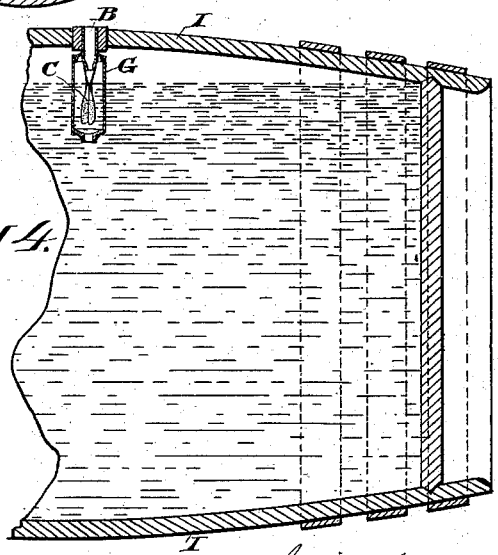

Figure 1 is a vertical longitudinal section, illustrating the annular flexible tube containing liquid, and applied to a waste or sewer pipe of such moderate size that said pipe serves as a guard against undue lateral extension of the annular tube or chamber. Fig. 2 is a longitudinal section, illustrating the application of the annular flexible tube or chamber within a short supplemental pipe to serve as a guard to limit its lateral extension. Fig. 3 is a longitudinal section, illustrating a modification in the construction of the lower extremity of the annular tube or chamber. Fig. 4 is a vertical section of the device as applied to a beer or wine cask to prevent the escape of the gas under pressure while permitting the entrance of air from without. Fig. 5 is a horizontal section of the device on a larger scale.

A may represent a waste or sewer pipe, and B a bushing secured within the neck of said pipe, to which bushing the annular flexible tube or sack C is secured at its upper end. In Figs. 1 and 2 the annular tube is shown as made of a single piece of material, for which purpose animal entrail or bladder is suitable. The material is turned on itself or partially inside out, so as to bring the ends together one within the other, as shown at c, where they are securely fastened gas-tight around the neck of the bushing B, leaving a central passage from D to D' surrounded by the annular chambered sack thus formed. E represent a body of glycerine or other liquid introduced into the annular chamber, and serving by its weight to close the passage D D' by compressing the inner wall of the annular sack against itself, excepting when separated by the downward passage of any fluid or of matter carried thereby. It will be apparent that pressure of gas within the sewer-pipe A, acting on the exterior of the annular tube or sack C, completely around the same, will tend to compress it from the outside inward, thus more forcibly and securely closing the channel D D' and completely preventing escape of said gas. To more securely and effectually close the channel D D', I also employ flexible bands F, placed within the chamber, around the interior wall of the tube, as shown in Fig. 1, in order to assist in the initial closure of the channel, especially at the upper end thereof, where the pressure of the contained liquid E has less effect. These flexible bands or annular springs are, however, omitted where it is desired that the apparatus shall be very sensitive in opening to permit the downward flow of fluids.

It will be observed in the illustration shown in Fig. 1 that the annular sack C so nearly fills the sewer-pipe that any considerable upward pressure of gas will tend to force the external walls of the said sack against the interior walls of the sewer-pipe, as well as compress the interior walls of the sack together.

In Fig. 2 I have shown a guard, G, formed of a short section of tube, within which the annular sack is inserted prior to its introduction into the sewer-pipe. Such guard may constitute a part or section of a vertical sewer-pipe, as shown in Fig. 2, if the pipe is too small to contain the sack, or it may be introduced within either a vertical or horizontal sewer-pipe of larger size, the sack and its guard being in either case in vertical position. The application and operation of gas-check sack and guard in a horizontal sewer-pipe of large size are substantially the same as shown in Fig. 4, which represents my gas-check applied to a barrel, as will presently be described. It is manifest that the same effect will be produced by forming the annular sack of two sleeves, one within the other, attached together at their lower as well as at their upper ends.

Fig. 3 represents a modification in which the sack is made in two separate annular pieces, one within the other, their upper ends being brought together and fastened as before, while their lower ends are tightly secured to a ring, H, which serves also as a weight to hold down the lower end of the annular chambered sack.

Fig. 4 shows the application of the same device shown in Figs. 1 and 2 to a beer or wine barrel, I being part of the barrel, and G a guard similar to that shown in Fig. 2. It will be apparent that any pressure of gas within the cask will completely close the vent D, while on the pressure being relieved or brought below that of the atmosphere by the drawing off of the liquor air will freely enter through the said vent D.

It is preferred to employ glycerine or other oil as the liquid with which the annular chamber of the sack is supplied, as this serves to lubricate the material of the sack, and, if the sack be made of rubber, preserves said rubber from devulcanization.

I am aware that gas-traps have before been made by the use of a section of flexible pipe surrounded by liquid in a chamber. This, therefore, I do not claim. My invention differs from the above in that I employ a suspended annular sack containing its own liquid, the gravity of which closes the passage when no internal pressure exists, and which sack is furthermore adapted to receive on its exterior the pressure of the confined gas, so that this pressure will have no tendency to open the passage.

I claim—

1. A sack of flexible material provided with an annular chamber containing a suitable liquid surrounding a central passage, so as to act as a gas-check, substantially as set forth.

2. The combination of the sack C, containing an annular chamber, and the guard G, as and for the purpose set forth.

3. The combination of the sack, containing an annular chamber, and elastic bands or springs F, substantially as and for the purposes set forth.

J. W. ROGERS.

Witnesses:
OCTAVIUS KNIGHT,
L. M. HOPKINS.